United States Patent Office 3,630,865
Patented Dec. 28, 1971

3,630,865
SEQUESTERING AGENTS AS ADDITIVES FOR ALKALI CHLORATES
Alfred O. Minklei, Kenmore, and Ronald H. Carlson, Lewiston, N.Y., assignors to Hooker Chemical Corporation, Niagara Falls, N.Y.
No Drawing. Filed Jan. 22, 1968, Ser. No. 699,370
Int. Cl. B23p 1/00, 1/16
U.S. Cl. 204—143 M           6 Claims

ABSTRACT OF THE DISCLOSURE

Certain compounds such as condensed alkali metal phosphates, aminocarboxylic acids and salts thereof, hydroxy acids and salts thereof, and organic phosphorus containing sequestering agents aid the functioning of chlorate solutions as electrolytes in electrochemical machining, milling, drilling, polishing and grinding operations.

---

This invention relates to improvements in electrochemical machining operations and improvemnts of the electrolytes therein.

In accordance with the present invention, a composition of matter comprising about 0.01 to about 50 parts by weight of a sequestering agent or mixture of sequestering agents selected from the group consisting of condensed alkali metal phosphates, amino carboxylic acids and salts thereof, organic phosphorus containing compounds and mixtures thereof, per 100 parts by weight of an alkali metal chlorate, is provided for use in electrochemical machining operations. Such a composition forms electrolytes comprising about 0.01 to about 50 parts by weight of sequestering agent and about 100 to about 2000 parts by weight of water per 100 parts by weight of alkali metal chlorate which electrolytes are useful in preventing the buildup of sludge and accelerating the rate of electrochemical shaping.

In electrochemical machining, the flow of a direct electric current between an anode workpiece and a cathode tool or die through a suitable electrolyte results in the removal of material from the workpiece. By electrochemical machining operations, we intend to include any process involving the electrochemical removal of metal from a workpiece, including those operations by which a workpiece is machined, milled, drilled, ground or polished by a mechanical process employed in combination with the electrochemical operation to produce shaped or curved structures. In a commercial type of electrochemical machining operation, a hollow tool electrode is advanced toward the work material while electrolyte is pumped through the hollow portion of the electrode.

The selection of an electrolyte for use in electrochemical machining operations is based upon its conducting properties, its tendency to attack the electrodes, its performance in electrochemical machining operations and its cost. Alkali metal chlorates, especially sodium chlorate and potassium, form good electrolytes when used in aqueous solutions containing about 150 to about 600 parts by weight of water per 100 parts by weight of alkali metal chlorate.

A major problem residing in the use of aqueous solutions of alkali metal chlorates as electrolytes in electrochemical machining operations is discussed in Metal Progress, March 1967, pp. 81–84. The buildup of sludge in the electrolyte impairs the shaping of the workpiece and decreases the life of the electrolyte. Although the alkali metal chlorate electrolytes are good electrolytes, improved electrolytes are needed to accelerate the rate of electrochemical shaping and improve the economics of electrochemical machining.

Aqueous solutions comprising a sequestering agent described herein, alkali metal chlorate and water are ideally suited as electrolytes for electrochemical machining operations. A major problem solved by such compositions, in electrochemical machining operations, is the rapid accumulation of sludge in the electrolyte. The electrolytic shaping of the workpiece results in an increase in the concentration of metal salts, metal hydroxides and metal oxides in the electrolyte. The used electrolyte solutions of sodium chlorate are usually of pH 6 to 14 and contain precipitated hydroxides of the metal removed from the workpiece. Sludge buildup impairs the shaping of the workpiece and presents a waste removal problem. The sludge may deteriorate the tool face, cause surface defaults on the workpiece, and may even cause damaging arcing or short circuits between the tool and the workpiece. If there is no removal of sludge from the electrolyte, the electrolyte must frequently be disposed of and replaced. The present invention reduces the sludge formation and increases the effective life of alkali chlorate electrolyte solutions by the inclusion of the mentioned sequestering agents in alkali metal chlorate electrolyte solutions before the electrochemical machining operation begins or during the operation by the periodic addition of a sequestering agent.

A preferred composition of this invention which may be substantially dry, comprises about 0.1 to about 25 parts by weight of a sequestering agent or mixture of sequestering agents per 100 parts by weight of an alkali metal chlorate. An even beter electrolyte is formed by the addition of about 150 to about 600 parts by weight of water per part of 100 parts of alkali metal chlorate. Electrolytes comprising about 2 to 15 parts by weight of sequestering agent or mixtures of sequestering agents and about 200 to about 500 parts by weight of water per 100 parts of alkali chlorate have been found to be particularly effective in aiding electrochemical machining operations. The above concentrations of sequestering agents in electrolyte are effective in retarding sludge formation in alkali metal chlorate electrolytes of a pH from about 7 to about 10, usually from about 7.2 to about 8.5. Usually, when an acid sequestering agent is used, a suitable base, such as an alkali metal hydroxide, preferably sodium hydroxide, potassium hydroxide or ammonium hydroxide may be added to adjust the pH to the level described herein. Greater or lesser proportions of sequestering agent may also be effective in certain operations.

In general, aminocarboxylic acids and their salts are among the preferred sequestering agents. Because of their availability, the following aminocarboxylic acids and their alkali metal salts, for example, are preferable for commercial electrochemical machining operations: N,N-di(2-hydroxyethyl)glycine, nitrilotriacetic acid, iminodiacetic acid, ethylenediaminetetraacetic acid. Other aminocarboxylic acids which may be used are as follows: N-hydroxyethylethylenediaminetriacetic acid, N-hydroxyethyliminodiacetic acid, iminopropionicacetic acid, iminodipropionic acid, nitrilopropionicdiacetic acid, nitrilodipropionicacetic acid, and nitrilotripropionic acid. Among the salts, the alkali metal salts, especially the sodium and potassium salts are preferred.

Among the condensed alkali metal phosphates, the sodium and potassium condensed phosphates are preferred. Because of their commercial availability, the following alkali metal phosphates are preferred: sodium pyrophosphate ($Na_4P_2O_7$), sodium tripolyphosphate ($Na_5P_3O_{10}$), sodium trimetaphosphate ($Na_3P_2O_9$), sodium hexametaphosphate ($NaPO_3)_6$, sodium tetrametaphosphate ($Na_4P_4O_{10}$) and potassium pyrophosphate ($K_4P_2O_7$).

Hexasodium tris (N,N - diacetatoaminomethyl)phosphine and tris hydroxymethyl phosphine oxide are among the preferred organic phosphorus containing sequesting agents.

It has been discussed that the condensed alkali metal phosphates, and trishydroxymethyl phosphine oxide and other phosphorus containing organic compounds, in addition to preventing the buildup of sludge, can effectively be employed in the electrolyte to accelerate the electrochemical removal of metal from the anode workpiece. When the phosphorus containing compounds are added to a typical electrolyte containing about 150 parts to about 600 parts by weight of water per 100 parts of alkali chlorate, for example, the rate of electrochemical removal of metal from the workpiece is increased by a factor of about 1.5 to about 10. Normally the electrolytes containing dilute concentrations of aikali metal chlorate have a slower cutting rate than the more concentrated alkali metal chlorate electrolytes. When the phosphorus containing compounds of the present invention are added to dilute electrolytes containing about 600 parts to about 2000 parts by weight of water per 100 parts of alkali chlorate, the cutting rate of the dilute alkali chlorate electrolyte is increased so that it removes metal at a rate equal to or greater than the cutting rate of a more concentrated alkali chlorate electrolyte without phosphorus containing sequesting agents added. If small increases in cutting rates and maximum sludge removal are desired, the phosphorus containing sequesting agents may be mixed with the non-accelerating aminocarboxylic acid sequesting agents and/or the hydroxy acids and their salts.

It has been discovered that although the hydroxy acids are effective in the prevention of sludge accumulation in electrochemical machining operations, they either retard or exhibit no appreciable effect on the rate of electrochemical removal of metal from the workpiece. In a preferred embodiment of this invention, the following hydroxy acids and their salts may be employed usually in mixtures with the phosphorus containing compounds of this invention: glycolic acid, lactic acid, $\beta$-hydroxybutyric acid, $\alpha$-hydroxybutyric acid, gluconic acid, malic acid, tartaric acid, and citric acid. Because of their commercial availability the alkali metal salts of the hydroxy acids, preferably the sodium and potassium salts, and especially the following sodium salts are preferred sequesting agents: sodium gluconate, sodium lactate, sodium $\beta$-hydroxybutyrate, sodium $\alpha$-hydroxybutyrate, sodium glycerate, sodium tartrate and sodium citrate. Sequesting agents comprising a mixture of the phosphorus containing sequesting agent of this invention and a hydroxy acid or salt thereof are effective for use in electrochemical machining operations.

The sequesting agents of the present invention are effective when employed in a typical process for electrochemical machining of a metal workpiece which comprises imposing an electrical potential and a direct current between the metal anode workpiece and a cathode tool, through an electrolyte comprised of about 0.01 part to about 50 parts by weight of a sequesting agent or mixtures of sequesting agents described herein and about 100 to about 2000 parts by weight of water per 100 parts of alkali metal chlorate with a gap between the workpiece and the tool of about 0.001 inch to about 2 inches, preferably from about 0.01 inch to about 0.5 inch, to remove metal from the workpiece. The electric potential is usually about 1 volt to about 48 volts, and preferably from about 5 volts to about 25 volts. The current density is usually about 10 amperes per square inch to about 6,000 amperes per square inch. The electrolytes discussed herein can effectively be employed in electrochemical machining operations that shape a variety of metals. The workpiece may be iron, nickel, cobalt, uranium, cadmium, copper, aluminum, beryllium, lead, magnesium, manganese, molybdenum, germanium and tin, alloys thereof, or alloys thereof containing carbon, silicon, phosphorus, sulfur, nitrogen, sodium. The electrochemical operation is effective when the workpiece is comprised of specially hardened and treated alloys.

In order that those skilled in the art may better understand the present invention and the manner in which it may be practiced, the following illustrations and examples are given. Unless otherwise indicated, all parts and percentages are by weight.

In Examples 1–9 the electrochemical machining operations were performed by using a graphite cathode as the tool and steel anode as the workpiece. In each example a control experiment was run without a sequesting agent in the electrolyte and a test experiment was run with the sequesting agent in the electrolyte. Both experiments in each example were run under identical electrochemical machining conditions. In all the experiments a gap of 1.7 inches was maintained between the graphite tool and the iron alloy workpiece. Unless otherwise indicated, a standard electrolyte with a concentration of sodium chlorate of 425 parts of sodium chlorate per 1000 parts of water was used in both the control and test experiments, a brow flocculent precipitate formed in the electrolyte a few minutes after the electric potential was applied between the tool and the workpiece, and the brown precipitate continued to accumulate as the control experiments were run. In the test electrolyte, containing the sequesting agent, no precipitate formed and the desired shaping resulted. A comparison of the metal loss from the workpiece of the control experiment with the metal loss from the workpieec of the test experiment within a given period of time permitted an evaluation of the relative effectiveness of the sequesting agents in accelerating the rate of electrochemical shaping.

EXAMPLE 1

For the control electrolyte 192 parts of standard electrolyte were used. The test electrolyte was prepared by adding a solution containing 11.7 parts of the trisodium salt of nitrilotriacetic acid, 6.6 parts of tris(hydroxymethyl)phosphine oxide and 3,4 parts of water to 150 parts of the standard electrolyte. The test and the control experiments were run in electrochemical machining operations at about 5 amperes per square inch and about 13 volts for a period of 60 minutes. At the end of the runs, the loss of metal from the workpiece in the test electrolyte was 3.6 grams while the loss of metal from the workpiece in the control electrolyte was 0.8 gram. The mixture of the sequesting agents in the test electrolyte increased the rate of electrochemical removal of the metal by 420 percent.

EXAMPLE 2

For the control, 152 parts of standard electrolyte were used. The test electrolyte was prepared by adding 2.4 parts of tris (hydroxymethyl) phosphine oxide to 150 parts of standard electrolyte. The test and control experiments were run in electrochemical machining operations at about 5 amperes per square inch and about 14 volts for a period of 30 minutes. At the end of the runs the desired smooth surface was obtained. The metal loss from the test workpiece was 2.0 grams, and the metal loss from the workpiece in the control electrolyte was 0.73 gram. The addition of tris (hydroxymethyl) phosphine oxide increased the rate of electrochemical removal of metal by over 260 percent.

EXAMPLE 3

For the control, 150 grams of standard electrolyte diluted with 30 grams of water were used. For the test electrolyte, 44.5 grams of a solution containing 57 percent sodium hexametaphosphate were added to 150 grams of the standard electrolyte. The test and control experiment were run in electrochemical machining operations at about 4 amperes per square inch and about 13 volts for a period of 45 minutes. At the end of this period, the metal loss from the test workpiece was 1.0 gram, and the metal loss from the control workpiece was 0.01 gram. The addition of sodium hexametaphosphate to the sodium chlorate electrolyte increased the rate of electrochemical removal of the metal by over 900 percent.

EXAMPLE 4

For the control, 150 parts of the standard electrolyte were diluted with 34 grams of water. For the test electrolyte, 150 parts of the standard electrolyte and a solution containing 34 parts of water and 4.03 grams of an 80/20 mixture (molar basis) of tris (hydroxymethyl) phosphine oxide to hexasodium tris(N,N-diacetatoaminomethyl) phosphine were used. The test and control experiments were run in electrochemical machining operations at about 5 amperes per square inch and about 13 volts for a period of 45 minutes. At the end of this period, the loss of metal at the electrode in the control electrolyte was 0.1 gram and the loss of metal from the electrode in the test electrolyte was 1.19 grams. The addition of the mentioned sequestering agents increased the rate of electrochemical removal of the metal by over 900 percent.

EXAMPLE 5

For control, 150 parts of standard electrolyte were used. The test electrolyte was 150 grams of a solution containing 106 parts of sodium chlorate per 100 parts of water. The test and control experiments were run at about 2 amperes per square inch and 14 volts for a period of 60 minutes. At the end of this period, the metal loss from the test workpiece was 0.0056 gram, and the loss of metal from the control workpiece was 0.015 gram. The rate of electrochemical removal of metal in the control electrolyte was 250 percent greater than the rate of removal of metal in a more dilute sodium chlorate test electrolyte.

EXAMPLE 6

For the control electrolyte, 150 parts of the standard electrolyte solution was used. The test electrolyte contained 122.8 parts of a solution containing 10.6 parts of sodium chlorate per 100 parts of water and 11.3 grams of an aqueous solution containing 23.9 percent of a 50/50 (molar ratio) mixture of tris (hydroxymethyl) phosphine oxide and the trisodium salt of nitrilotriacetic acid. The test and control experiments were run at about 2 amperes per square inch and 14 volts for a period of 60 minutes. At the end of this period, the metal loss from the test workpiece was 0.1 gram and the loss of metal from the control workpiece was 0.012 gram. Even with the use of a more dilute concentration of sodium chlorate in the test electrolyte the test electrolyte removed metal 900 percent faster than the control electrolyte.

EXAMPLE 7

For the control electrolyte, 170 parts of standard electrolyte were used. The test electrolyte consisted of 150 grams of standard electrolyte to which 20 parts of water and 6.3 parts of sodium tripolyphosphate had been added. The test and control experiments were run at about 5 amperes per square inch and 14 volts for a period of 60 minutes. At the end of this period, the metal loss from the workpiece in the test electrolyte was 0.86 gram while the loss of metal from the workpiece in the control electrolyte was 0.031 gram. The rate of electrochemical removal of metal in the dilute test electrolyte was over 250 percent faster than the rate of removal of metal from the workpiece in the control electrolyte.

EXAMPLE 8

For the control electrolyte 157 parts of standard electrolyte were used. The test electrolyte was prepared by adding 3.3 parts of gluconic acid and 67 parts of a 50 percent solution of NaOH, used to increase the pH of the electrolyte, to 150 parts of the standard electrolyte. The test and control experiments were run in electrochemical machining operations at about 5 amperes per square inch and about 14 volts for a period of 60 minutes. At the end of the runs, the metal loss from the test workpiece was 0.43 gram while the metal loss from the control workpiece was 1.6 grams. The addition of gluconic acid decreased the rate of electrochemical metal removal by 270 percent.

EXAMPLE 9

For the control and test electrolyte, 157 parts of standard electrolyte were used. To the test electrolyte 7.7 grams of an aqueous solution containing 41 percent by weight of sodium N,N-di(2-hydroxyethyl) glycinate were added. The test and control experiments were run in electrochemical machining operations at about 5 amperes per square inch and about 14 volts. At the end of 30 minute runs the metal loss of the anode workpiece of the control experiment was 0.054 gram while the metal loss of the anode in the test experiment was 0.032 gram. The addition of sodium N,N-di(2-hydroxyethyl) glycinate decreased the rate of electrochemical shaping of the workpiece by 17 percent.

EXAMPLE 10

For the control and test electrolyte equal parts of standard electrolyte is used. To the test electrolyte 4 parts of tris(hydroxymethyl) phosphine oxide is added per 100 parts of sodium chlorate in the electrolyte. A high chromium alloy, Type 302, is used as the workpiece and the gap between the tool and the workpiece is reduced to 0.03 inch. The test and the control experiment are run at 200 amperes per square inch and 20 volts. At the end of a 20 minute period a precipitate is observed in the control experiment, while in the test experiment, no form of sludge is present. The workpiece is effectively cut and shaped. An acceleration in the cutting rate comparable to the results of Example 1 is achieved due to the sequestering agent, tris(hydroxymethyl) phosphine oxide.

While there have been described various embodiments of the invention, these are not to be understood as limiting the scope of the invention, as it is realized that changes therein are possible. It is intended that each element recited by any of the claims is to be understood as referring to all equivalent elements for accomplishing substantially the same results in substantially the same or equivalent manner. It is intended to cover the invention broadly, whatever form it may be utilized.

We claim:

1. A process for accelerating the rate of metal removal from an anode workpiece in electrochemical machining, utilizing an alkali metal chlorate electrolyte, which comprises imposing an electrical potential and a direct current between the metal anode workpiece and a cathode tool through an electrolyte comprised of about 0.1 part to about 25 parts of a sequestering agent selected from the group consisting of condensed alkali metal phosphates, hexasodium tris (N,N-diaceto aminomethyl)phosphine, tris(hydroxyethyl)phosphine oxide and mixtures thereof, and comprised of about 100 parts to about 2000 parts of water per 100 parts of alkali metal chlorate with a gap between the workpiece and tool of about 0.001 inch to about 2 inches, to remove metal from the workpiece.

2. The process of claim 1 wherein the sequestering agent is tris(hydroxymethyl)phosphine oxide.

3. The process of claim 1 wherein the sequestering agent is a composition of hexasodium tris(N,N-diacetatoamino methyl)phosphine and tris(hydroxyethyl)phosphine oxide.

4. The process of claim 1 wherein the electrolyte additionally contains a sequestering agent selected from the group consisting of aminocarboxylic acids and alkali metal salts thereof and hydroxy acids and alkali metal salts thereof.

5. The process of claim 1 wherein the condensed alkali metal phosphate is selected from the group consisting of sodium pyrophosphate, sodium tripolyphosphate, sodium trimetaphosphate, sodium hexametaphosphate, sodium tetrametaphosphate and potassium pyrophosphate.

6. A process according to claim 1 wherein the electric potential is from about 1 volt to 48 volts.

References Cited
UNITED STATES PATENTS

| | | | |
|---|---|---|---|
| 2,092,130 | 9/1937 | Lyon, Jr. | 204—145 X |
| 2,798,846 | 7/1957 | Comstock 3d | 204—143 |
| 2,805,197 | 9/1957 | Thibault et al. | 204—143 |
| 2,915,444 | 12/1959 | Meyer | 204—145 |
| 3,207,683 | 9/1965 | Hermann | 204—145 |
| 3,293,148 | 12/1966 | Dell et al. | 252—79.5 X |
| 3,304,246 | 2/1967 | Fukui et al. | 204—145 |
| 3,407,129 | 10/1968 | Petrocelli et al. | 204—145 |
| 3,420,760 | 1/1969 | Freedman et al. | 204—145 |
| 3,438,901 | 4/1969 | Vassileff | 252—79.4 X |
| 2,939,825 | 6/1960 | Faust et al. | 204—143 |
| 3,242,062 | 3/1966 | Covington | 204—143 |
| 3,409,522 | 11/1968 | Grenier et al. | 204—143 |
| 3,477,953 | 11/1969 | Carlson | 260—606.5 |

DANIEL E. WYMAN, Primary Examiner

P. E. KONOPKA, Assistant Examiner

U.S. Cl. X.R.

204—140.5, 141, 143 G, 145 R; 252—79.1